(12) United States Patent
Oosterling et al.

(10) Patent No.: US 6,578,516 B1
(45) Date of Patent: Jun. 17, 2003

(54) DEVICE AND METHOD FOR MILKING ANIMALS, AND A CONTAMINATION METER

(75) Inventors: Pieter Adriaan Oosterling, Nieuw-Vennep (NL); Jacobus Petrus Maria Dessing, Hoofddorp (NL)

(73) Assignee: Prolion B.V., Vifthuizen (NL)

(*) Notice: Subject to any disclaimer, the term of this patent is extended or adjusted under 35 U.S.C. 154(b) by 0 days.

(21) Appl. No.: 09/868,162

(22) PCT Filed: Dec. 8, 1999

(86) PCT No.: PCT/NL99/00753

§ 371 (c)(1),
(2), (4) Date: Sep. 17, 2001

(87) PCT Pub. No.: WO00/35270

PCT Pub. Date: Jun. 22, 2000

(30) Foreign Application Priority Data

Dec. 16, 1998 (NL) .............................................. 1010829

(51) Int. Cl.⁷ ................................................ A01J 09/02
(52) U.S. Cl. ................................ 119/14.18; 119/14.32; 210/371; 210/374
(58) Field of Search ........................... 119/14.18, 14.33, 119/14.32, 14.34; 210/391, 393, 380.1, 380.3, 371, 374, 376

(56) References Cited

U.S. PATENT DOCUMENTS

| | | | | |
|---|---|---|---|---|
| 1,284,587 A | * | 11/1918 | Bylander | 210/337 |
| 1,307,677 A | * | 6/1919 | Konkle | 119/14.08 |
| 2,547,797 A | * | 4/1951 | Torrey et al. | 210/445 |
| 3,139,857 A | * | 7/1964 | Merritt et al. | 119/14.46 |
| 3,692,178 A | * | 9/1972 | Reece | 210/333.1 |
| D234,721 S | * | 4/1975 | Rosenberg | D23/209 |
| 3,954,613 A | * | 5/1976 | Worlidge | 210/108 |
| D247,252 S | * | 2/1978 | Rosenberg | D23/209 |
| 4,087,363 A | * | 5/1978 | Rosemeyer et al. | 210/315 |
| D252,284 S | * | 7/1979 | Calzia et al. | D22/146 |
| D252,470 S | * | 7/1979 | Pawlak | D24/110 |
| 4,170,056 A | * | 10/1979 | Meyst et al. | 210/446 |
| D262,484 S | * | 12/1981 | Ward et al. | D23/209 |
| 4,356,791 A | * | 11/1982 | Ward et al. | 119/14.33 |
| 4,385,590 A | * | 5/1983 | Mortensen | 119/14.01 |
| 4,643,197 A | * | 2/1987 | Greene et al. | 600/575 |
| 5,452,492 A | * | 9/1995 | Hamilton | 15/340.1 |
| 5,722,343 A | * | 3/1998 | Aurik et al. | 119/14.02 |
| 5,996,529 A | * | 12/1999 | Sissom et al. | 119/14.14 |
| 6,098,570 A | * | 8/2000 | Aurik et al. | 119/604 |
| 6,227,142 B1 | * | 5/2001 | Birk | 119/14.08 |
| 6,234,109 B1 | * | 5/2001 | Andersson et al. | 119/14.08 |
| 6,308,655 B1 | * | 10/2001 | Oosterling | 119/14.08 |

FOREIGN PATENT DOCUMENTS

EP          0 653 153        * 11/1994 ............. A01J/7/00

* cited by examiner

Primary Examiner—Charles T. Jordan
Assistant Examiner—Stephen A Holzen
(74) Attorney, Agent, or Firm—St. Onge Steward Johnston & Reens LLC

(57) ABSTRACT

The invention relates to a device and method for milking animals, in which the milk which is removed is conveyed through a filter element. Any material which is deposited on the filter element is detected and, if appropriate, identified. After detection is complete, the direction of flow through the filter element is reversed, so that the filter material is rinsed clean. The invention also comprises a contamination meter for user in the device and method mentioned above.

13 Claims, 2 Drawing Sheets

DEVICE AND METHOD FOR MILKING ANIMALS, AND A CONTAMINATION METER

Figure 1:
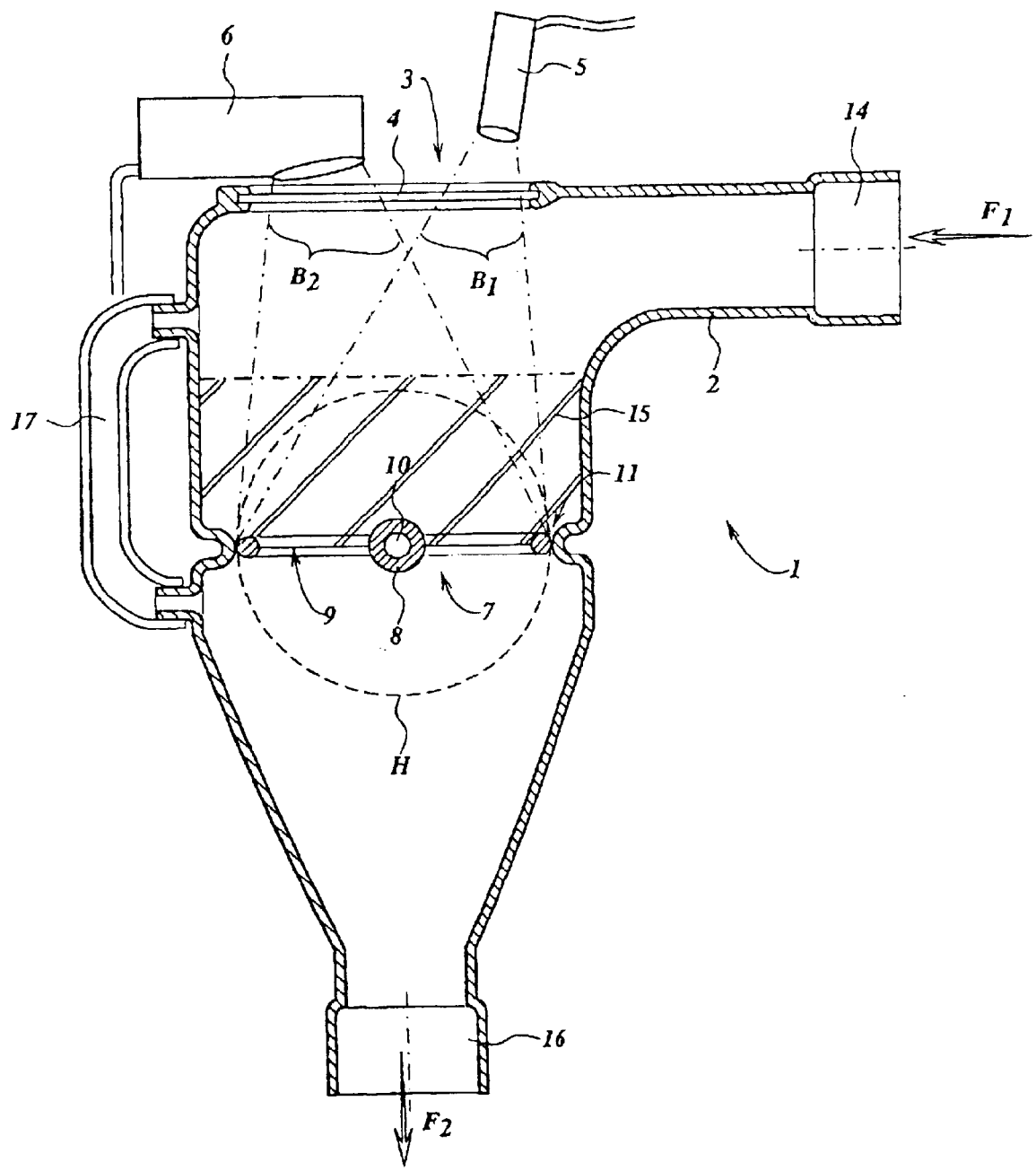

The invention relates to a device according to the preamble of Claim 1. A device of this nature is known from patent application WO 9828969, filed by the same applicant. The drawback of the known device is that separate flows of liquid have to be generated in order to clean the filter element, making the device complicated.

The object of the invention is to avoid this drawback, and to this end the device is designed according to the characterizing part of Claim 1. As a result of the direction of flow through the filter element being reversed, the flow of liquid, which runs in the same line, cleans the filter element. The result is a simple device.

According to one embodiment, the device is designed according to Claim 2. In this way, the direction of flow is reversed in a simple manner.

According to a further refinement, the device is designed in accordance with Claim 3. As a result of the cleaning of the filter element being mechanized, the device can be connected to a control system and can be carried out automatically.

According to a further refinement, the device is designed as described in Claim 4. In this way, it is easy to establish the presence of flakes or contamination on the filter element.

According to a further refinement, the device is designed in accordance with Claim 5. As a result of the detector and, if appropriate, the radiation source being positioned outside the flow of liquid, they will be less exposed to contamination and there will be less disruption.

According to a further refinement, the device is designed as described in Claim 6. In this way, the liquid, such as milk, can flow uniformly through the filter element.

According to a further refinement, the device is designed as described in Claim 7. In this way, air which is entrained by the liquid and liquid, such as milk, which is flowing in too quickly can easily be diverted past the filter element, thus limiting she formation of foam.

According to a further refinement, the device is designed as described in Claim 8. In this way, it is simple to link the results of the detection to the source of the infection in an animal, so that specific measures can be taken and the animal can, for example, be picked out and treated.

According to a further refinement, the device is designed as described in Claim 9. This ensures that milk of different levels of quality is stored in different storage tanks.

According to a further refinement, the device is designed as described in Claim 10. In this way, the quality of milk which is to be delivered to a storage tank can be established and recorded in a simple and, if appropriate, automatable manner.

According to a further refinement, the device is designed as described in Claim 11. In this way, it is possible to establish the quality of the milk in each quarter of the udder, with the result that the state of health of the milked animals can be established with greater accuracy.

The device also comprises a method according to Claim 12. This method ensures that it is possible, at each milking operation, to establish whether the milk which is removed is free of flakes or contamination. In this way, it is possible to accurately monitor the quality of the milk from each milked animal.

According to a refinement, the invention comprises a method according to Claim 13. This allows the quality of milk supplied by each animal to be accurately monitored and also allows the health of the udders of the milked animals to be monitored.

The invention also comprises a contamination meter for use in the abovementioned device and method.

Figure 2:
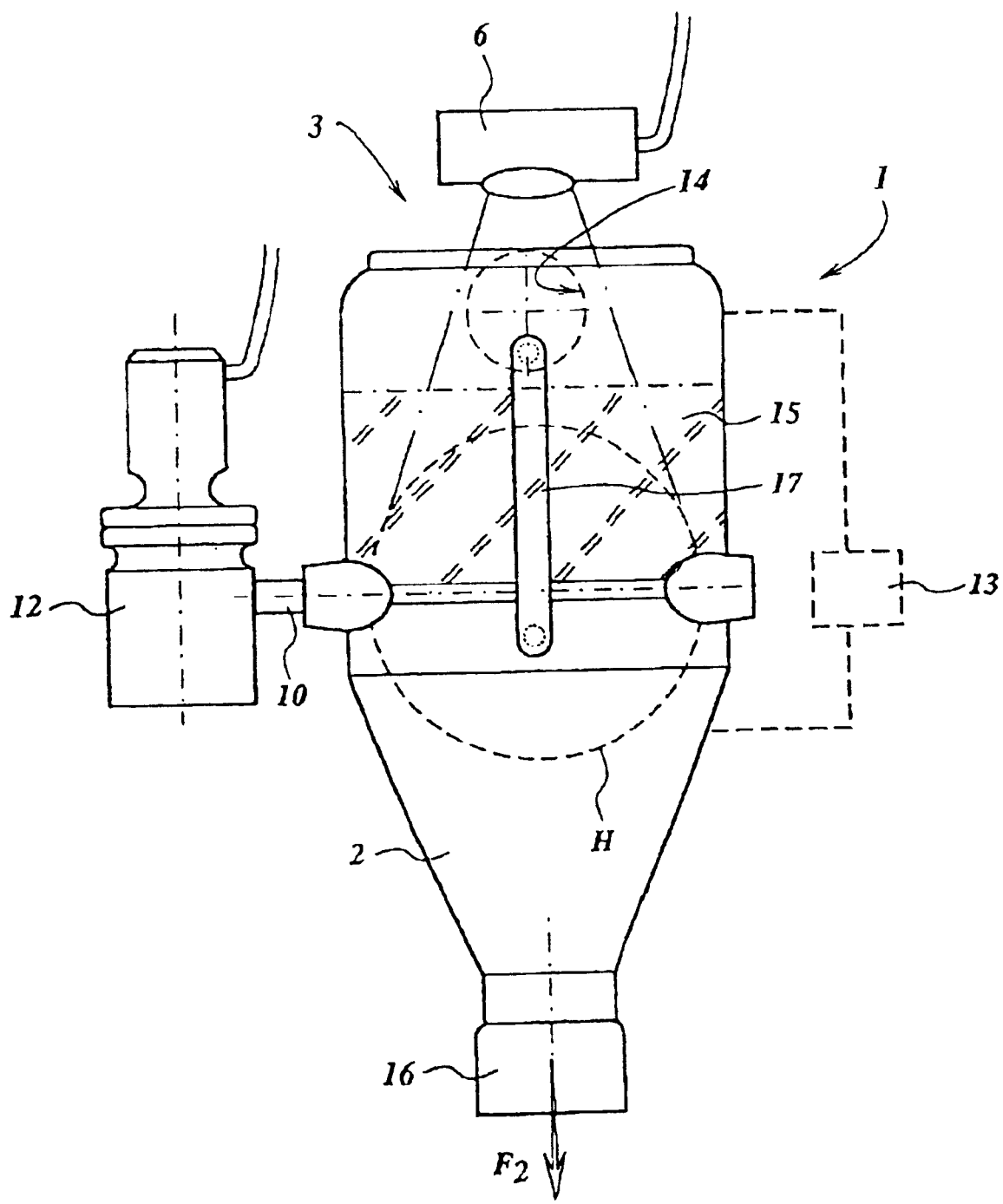

The invention will be explained below on the basis of exemplary embodiments and with reference to a drawing, in which:

FIG. 1 shows a diagrammatic cross section through a contamination meter such as that which can be positioned in a milk line, and FIG. 2 shows a side view of the contamination meter shown in FIG. 1.

As far as possible, identical reference numerals are used in both figures.

When animals are being milked, milking cups are attached to the udders of the animals which are to be milked. During milking, a pulsating movement is generated in the milking cup, with the result that milk flows out of the udder into the milking cup. The milk flows through a milk line to storage means. A subatmospheric pressure prevails in these storage means, so that the milk which emerges from the udder is drawn through the milk line. After an animal has been milked, the milk which has been collected in the storage means is pumped to a tank. In a known manner, known devices of this nature are provided, inter alia, with valves, pumps, vacuum ports and a control unit.

In order to detect contamination or flakes in the milk, a contamination meter 1 is positioned in the milk line leading from the milking cups to the storage means or in the milk line leading from the storage means to the tank. The contamination meter 1 is connected, in a manner which is not shown, to a control unit in which the results of the measurement are analysed and stored. While the milk is flowing to the storage means via the contamination meter 1, the quality of the milk is established. Valves are arranged between the storage means and the tank for the purpose of removing any milk of poor quality into a tank containing waste milk. If appropriate, there may be a plurality of tanks for milk of different qualities, in which case the valves are set in such a way, depending on the result of the measurement using the contamination meter 1 and, if appropriate, the identity of the milked animal, that the tanks always contain milk of the same quality.

The contamination meter 1 comprises a housing 2 in which a filter 7 is mounted. The housing 2 is mounted in he milk line, the flow of milk flowing into the housing 2 at an inlet 14, with a direction of flow $F_1$, flowing through the housing 2 and leaving the housing at an outlet 16 with a direction of flow $F_2$. At the location of the filter 7, the passage running through the housing 2 has a cross section which is larger than the cross section at the inlet 14 or outlet 16. The filter 7 has a filter frame 8 in which filter material 9 is positioned. The filter frame 8 is circular on the outside and can rotate about a pin 10. The outer edge of the filter frame 8 may be sealed against the inner wall of the housing 2 by means of a seal 11, which is attached to the housing 2 or to the filter frame 8.

In a position of the filter frame 8 in which the filter frame 8 is resting in a sealed manner against the housing 2, the milk which flows from the inlet 14 to the outlet 16 flows through the filter material 9. The contamination, blood residues or flakes of milk which have been formed as a result, for example, of an infection in the udder, which are present in the milk, are collected on the filter material 9 and become visible thereon, for example because the filter material 9 is of a dark colour. The dimensions of the filter frame 8 and the openings in the filter material 9 are selected in such a way that the surface area of the passage opening through the filter material 9 is more or less equal to the passage opening at the location of the inlet 14 or the outlet 16.

In one embodiment, the contamination meter 1 is positioned in such a manner that, during use, the filter material 9 lies in a horizontal plane and the liquid which is to be filtered can lie in a buffer chamber 15 as a layer on top of the filter 7. If the incoming flow of liquid is greater than the flow through the filter 7, the liquid level in the buffer chamber 15 rises and, in the event of the liquid rising further, flows directly, via a line 17, to the outlet 16. Air which is entrained with the liquid can also flow directly, via the line 17, to the outlet 16. This prevents, as far as possible, the air becoming mixed with the milk and forming foam.

In another embodiment, the filter 7 is positioned vertically and the buffer chamber 15 is arranged in front of the filter material 9. The line 17 is then arranged in such a manner that the buffer chamber 15 can overflow via the line 17 when a considerable Quantity of liquid is present in the buffer chamber 15, flowing, for example under the influence of gravity, through the filter material 9.

In the housing 2 there is a window 3 with glass 4, the glass 4 being positioned in such a manner in the wall of the housing 2 that the entire filter 7 can be seen through the window 3, so that the contamination can be observed through the window 3. For observation purposes, a lamp 5 is positioned in front of the glass 4, which lamp illuminates the filter 7 by means of a light beam $B_1$, and there is also a camera 6, such as for example a CCD camera, which is able to observe the contamination on the filter by means of a reflected beam $B_2$.

The radiation which is emitted by the lamp 5 may be ordinary white light, or alternatively infrared or ultraviolet light may be used, so that the flakes in the milk which have been deposited on the filter 7 can be detected more successfully. If appropriate, camera 6 and lamp 5 are combined.

After milk has finished flowing through the filter 7, the residues which have been deposited on the fitter material 9 are observed by the camera 6. The camera 6 is connected to a processing unit with a memory. The contamination observed is compared with limit values which are contained in the memory, and the processing unit establishes the nature and/or type of the contamination detected and what consequences this observation will have. Consideration may be given to the separate removal of the milk, to the separate storage of the milk, to singling out the milked animal or to measures which relate to future milking operations. In most operations, use will be made of the identity of the milked animal, which is established in a known manner, for example in the milking parlour, using an identification system.

In an alternative embodiment, the contamination meter 1 may also be designed with a differential pressure sensor 13. This is used to measure the pressure difference across the filter material 9 while milk is flowing. The contamination which is deposited on the filter material 9 causes a greater pressure difference across the filter 7. The pressure difference observed is stored in the memory, and this information is used when establishing the nature and seriousness of the contamination.

After the observation of the contamination has been completed, the filter frame 8 is reversed as a result of the shaft 10 being rotated through approximately 180° using a drive 12. In doing so, the filter frame 8 describes a path H. If milk from a subsequent milked animal then flows from the inlet 14 to the outlet 16, the contamination and flakes which have previously been deposited on the filter material 9 are entrained by the flow of milk $F_1$, $F_2$, so that the filter is cleaned again and will not become blocked. If, at the start of milking, water is introduced into the milking cup, in order to rinse any first milk out of the line, as described in patent application WO 9828969, filed by the same applicant, this water can also be used to rinse the filter material 9 clean. Features are then provided for separating off the rinsing water, so that this water, together with the contamination which has been deposited on the filter material 9, does not enter the milk tank. The contamination of the milk from the following milked animal is established, since this contamination and these flakes are deposited on that side of the filter material 9 which faces towards the window 3. If appropriate, during rinsing by the rinsing water, the filter 7 is positioned in such a way that the liquid can run past it without being filtered, for example if it is observed that the filter 7 is not contaminated and does not need cleaning.

The embodiments of the contamination meter 1 described above can be used in an automatic milking device, in which the milking cups are automatically connected to the udder of the animal which is to be milked.

As a result of the contamination meter 1 being used, the quality of the milk is visually inspected, which is sometimes a requirement. The contamination which is deposited on the filter 7 can also be inspected by an operator. In a simple embodiment without a camera 6 and a drive 12, the contamination meter 1 can be used in devices in which the milking cups are attached by hand.

In addition to the exemplary embodiment described above, in which the direction of flow $F_1$, $F_2$ through the filter element 9 is reversed as a result of the filter frame 8 being rotated, it is also possible to use an embodiment in which the direction of flow is reversed in a different way and in which, for example, there are also two windows 3, one for each direction of flow.

In the exemplary embodiment described above, the standard features for cleaning the device by circulating hot water containing chemicals are also present. For this purpose, the interior of the housing 2 and the filter 7 are designed in such a manner that all the walls are smooth and without dead corners, so that growth of bacteria is limited as far as possible. If appropriate, the contamination meter 1 may be able to be dismantled, so that its interior can be cleaned periodically.

What is claimed is:

1. Device for milking animals, comprising a milk line which runs from a milking cup to a storage tank, means for conveying liquid, through the milk line in a direction of flow, a filter element (7), which is positioned in the milk line, for filtering a flow of liquid ($F_1$ $F_2$) which is flowing from the milking cup to the storage tank, and means (5, 6) for detecting material which has been deposited on the filter element, characterized in that there are means (10, 12) for reversing the direction of flow of the liquid through the filter element (7) while the direction of the fluid flow through the device remains in the same direction.

2. Device according to claim 1, characterized in that the means for reversing the direction of flow comprises a rotatably mounted filter element (7).

3. Device according to claim 2, characterized in that the filter is attached to a displacement means for rotation of the filter and which comprises a rotatable pin (10) and a drive (12).

4. Device according to claim 1 characterized in that the means for detecting material which has been deposited on the filter element (7) comprises a detector (6) for detecting radiation and a radiation source (5) for irradiating the filter element.

5. Device according to claim 4, characterized in that the detector (6) is positioned outside the milk line, and the milk line is provided with a window (3) for transmitting radiation from milk material deposited on the filter.

6. Device according to claim 1, characterized in that upstream of the filter element (7) there is a buffer chamber (15) for the buffered storage of liquid which is to be filtered.

7. Device according to claim 6, characterized in that there is a bypass line (17) between the milk line upstream of the buffer chamber (15) and the milk line downstream of the filter element (7).

8. Device according to claim 1, characterized in that means are provided for identifying animals which have been milked, as well as means for establishing the part of the udder from which detected material originates.

9. Device according to claim 1 further comprising a plurality of storage tanks at the end of said milk line, characterized in that said liquid is milk, and the milk line is provided, downstream of the filter element (7), with second storage means for storing milk for each milking operation, and with switching means for guiding milk from said second storage means to said plurality of storage tanks.

10. Device according to claim 9, in which said filter element is positioned in said the milk line between said second storage means and said plurality of storage tanks.

11. A method for milking animals with an apparatus having a milk line which runs from a milking cup to a storage tank and uses means for conveying liquid such as milk through the milk line with a direction of flow and in which a filter element is positioned in the milk line to filter the flow of liquid as it flows from the milking cup to the storage tank, a device to detect material which has been deposition the filter element characterized in that the direction of flow through the filter element (9) is reversed after each milking operation while the direction of the fluid flow through the device remains in the same direction.

12. Method according to claim 11, characterized in that after each milking operation and before the direction of flow through the filter element (9) is reversed, data concerning the contamination is detected and data representative of the source of the milk is stored in a control unit and is then linked to the identity of the animal from which the milk was taken.

13. Method according to claim 11, characterized in that after each milking operation and before the direction of flow through the filter element (9) is reversed, data concerning the contamination and the source of the milk is stored in a control unit and is then linked to the identity of the animals from which the milk was taken.

* * * * *